United States Patent [19]

Roth

[11] Patent Number: 4,858,335
[45] Date of Patent: Aug. 22, 1989

[54] PROCESS FOR REGENERATING A MOISTURE LADEN DRYING CARTRIDGE AND APPARATUS FOR CARRYING OUT SUCH A PROCESS

[75] Inventor: Paul Roth, Isny/Allgaeu, Fed. Rep. of Germany

[73] Assignee: Motan Gesellschaft mit beschraenkter Haftung, Isny/Allgaeu, Fed. Rep. of Germany

[21] Appl. No.: 116,761

[22] Filed: Nov. 4, 1987

[30] Foreign Application Priority Data

Nov. 5, 1986 [DE] Fed. Rep. of Germany ....... 3637700

[51] Int. Cl.$^4$ ............................................. F26B 21/06
[52] U.S. Cl. .......................................... 34/32; 34/80;
55/179
[58] Field of Search ................... 34/20, 22, 77, 76, 61,
34/62, 80, 32; 55/179, 180, 387

[56] References Cited

U.S. PATENT DOCUMENTS 4,189,848 2/1980 Ko et al. ............................... 34/80 X
4,601,114 7/1986 Noguchi ............................. 34/80 X Primary Examiner—Henry A. Bennet
Attorney, Agent, or Firm—Foley & Lardner, Schwartz, Jeffery, Schwaab, Mack, Blumenthal & Evans

[57] ABSTRACT

A process for regenerating a moisture charged drying cartridge and apparatus for carrying out the process. Drying cartridges are used to prepare drying air for drying synthetic plastics in the form of granulates or powders. Used drying air, which has become charged with moisture, is passed through a drying cartridge which takes up the moisture from the drying air. The dried drying air can then be passed again through the material to be dried. In regenerating a spent, moisute laden drying cartridge, external air is collected, heated and exhausted after passage through the cartridge, which subsequently must be cooled. In order to achieve the lowest possible dew point after regeneration of a cartridge to be dried with a minimum consumption of energy, the regeneration air is passed in a closed regeneration circuit (11) through the cartridge (9'). The drying cartridge (9) lies in a drying circuit which includes a chamber (1) for the material to be dried, and it can be switched into a regeneration line (12) which forms a portion of the closed regeneration circuit (11). With this process and apparatus the moisture in the cartridge (9') can be expelled substantially without any energy loss.

3 Claims, 5 Drawing Sheets

PROCESS FOR REGENERATING A MOISTURE LADEN DRYING CARTRIDGE AND APPARATUS FOR CARRYING OUT SUCH A PROCESS

BACKGROUND OF THE INVENTION

This invention relates to a process for regenerating a moisture laden drying cartridge as well as to a drying apparatus including means for regenerating a moisture laden drying cartridge.

Drying cartridges are utilized to prepare drying air for drying synthetic plastics, which may be in the form of granulates and powders. The drying air is first passed through the material to be dried, whereby the drying air takes up moisture from the material. Subsequently, this air laden with moisture is passed through the drying cartridge which removes the moisture from the drying air. Thereafter, the drying air passes again to the material to be dried. This drying process is continued for so long until the drying cartridge can hardly remove any more moisture from the drying air. In continuously operating processes several, usually two to four, drying cartridges are used, one of which is always being regenerated. Thereby, a sufficient number of drying cartridges are always available. In discontinuously operating systems only one drying cartridge is used, which can be used for so long until the dew point has a correspondingly high temperature and only a little more moisture can be removed from the drying air. Then, this drying cartridge must be regenerated. In the regeneration, atmospheric air is heated and conducted through the cartridge to be regenerated, whereby the heated air picks up the moisture from the cartridge to be regenerated. The regeneration air is hereby warmed in order to be able to pick up the moisture as rapidly as possible. After passage through the cartridge to be regenerated, the moisture laden regeneration air is exhausted. In this known process, atmospheric air is continually drawn in from outside, heated before entry into the cartridge to be regenerated, and exhausted again after passage through the cartridge. The exhausted air contains a large amount of energy which is exhausted unused. In addition, significant amounts of energy must be utilized to heat the atmospheric air in order to warm the continuously flowing cool atmospheric air to the desired temperature.

As a rule, the cartridge to be regenerated must be cooled after regeneration before it can be used again to dry the material For this purpose in the known process the heating device is shut off and only cool atmospheric air is thereafter conducted through the dried cartridge. This atmospheric air partially remoistens the cartridge so that the degree of effectiveness of the apparatus which operates according to this process is detrimentally affected.

SUMMARY OF THE INVENTION

It is the object of the invention to further develop the foregoing process and the foregoing apparatus in such a way that after regeneration of the cartridge, an optimum, lowest possible dew point is achieved.

A further object of the invention is to further develop the foregoing process and apparatus so that a lesser amount of energy will be needed for the regeneration.

These and other objects of the invention are achieved by providing a process for regenerating a moisture laden drying cartridge comprising circulating a stream of heated regeneration air through said cartridge in a closed regeneration circuit to take up moisture from the cartridge and thereafter passing cooling air through said cartridge in said closed regeneration circuit.

According to a further aspect of the invention, the objects are achieved by providing a drying apparatus including means for regenerating a moisture laden drying cartridge comprising a drying circuit including a drying chamber for material to be dried, means for circulating a flow of drying air through said drying chamber, and at least one drying cartridge connected to said air circulating means for removing moisture from a stream of air withdrawn from said drying chamber, a closed regeneration circuit through which a stream of regeneration air can be circulated to remove moisture from a moisture laden drying cartridge, and means for switching a drying cartridge from said drying circuit to said regeneration circuit.

In the process of the invention, regeneration air is passed in a closed regeneration circuit through the cartridge to be regenerated. In this closed system the moisture can thereby be driven out of the cartridge to be regenerated substantially without any loss of energy-energy losses through insulation are negligible—without the necessity of an expensive heat exchanger for the outlet gas of a non-closed circuit or the like. During this drying operation, no new atmospheric air is introduced from outside into the regeneration, so that also only a little energy is necessary to heat the regeneration air. Upon passing through the cartridge to be regenerated, the air loses only so much energy as is required to heat the cartridge and to evaporate the moisture found in the cartridge. Therefore, substantially only the heat of evaporation needs to be supplied again to the regeneration air flowing in the circuit. A very low optimum dew point can thereby be achieved with the lowest possible consumption of energy so that the regenerated cartridge produces optimum results in later drying of material The cartridge which has been dried during regeneration, and thereby heated, is subsequently cooled, whereby the cooling air is likewise conducted through the cartridge in the closed regeneration circuit Thus, during the cooling no moist atmospheric air is introduced from outside the circuit, so that after the cooling, the cartridge has the lowest possible dew point. The cooling-down energy released in this cooling operation can be economically utilized via a heat exchanger, for example to heat the drying air which is used to dry the material. It is also possible, however, to conduct the released energy away in an economical manner. This is necessary, for example, if the cooling air after passage through the regenerated cartridge to be cooled still has such a high temperature that it cannot be used to dry the material. In this case it is advantageous to pass the cooling air in the regeneration circuit through the heat exchanger which takes up the heat from the cooling air and releases it to the surrounding environment. It is always possible to carry away of the energy of the hot cartridge, which has been regenerated, through the heat exchanger in the drying circuit, whereby a regulating device is provided so that the temperature of the drying circuit will not become too high. An optimum, lowest possible dew point results after the regeneration of the cartridge to be regenerated with the lowest possible total energy consumption because both the drying stage and also the cooling stage in the regeneration procedure are each carried out in the closed regeneration circuit.

In the apparatus of the invention the regeneration line, in which the cartridge to be regenerated lies, is a part of the closed regeneration circuit. If the drying cartridge used to dry the material has picked up sufficient moisture, it is switched into this regeneration circuit so that the moisture laden drying cartridge can be regenerated with the smallest possible consumption of energy.

Further features of the invention will become apparent from a consideration of the following description and accompanying drawings.

BRIEF DESCRIPTION OF THE DRAWINGS

The invention will be explained in more detail with reference to working embodiments illustrated in the drawings, in which.

DETAILED DESCRIPTION OF PREFERRED EMBODIMENTS

Figure 1A:
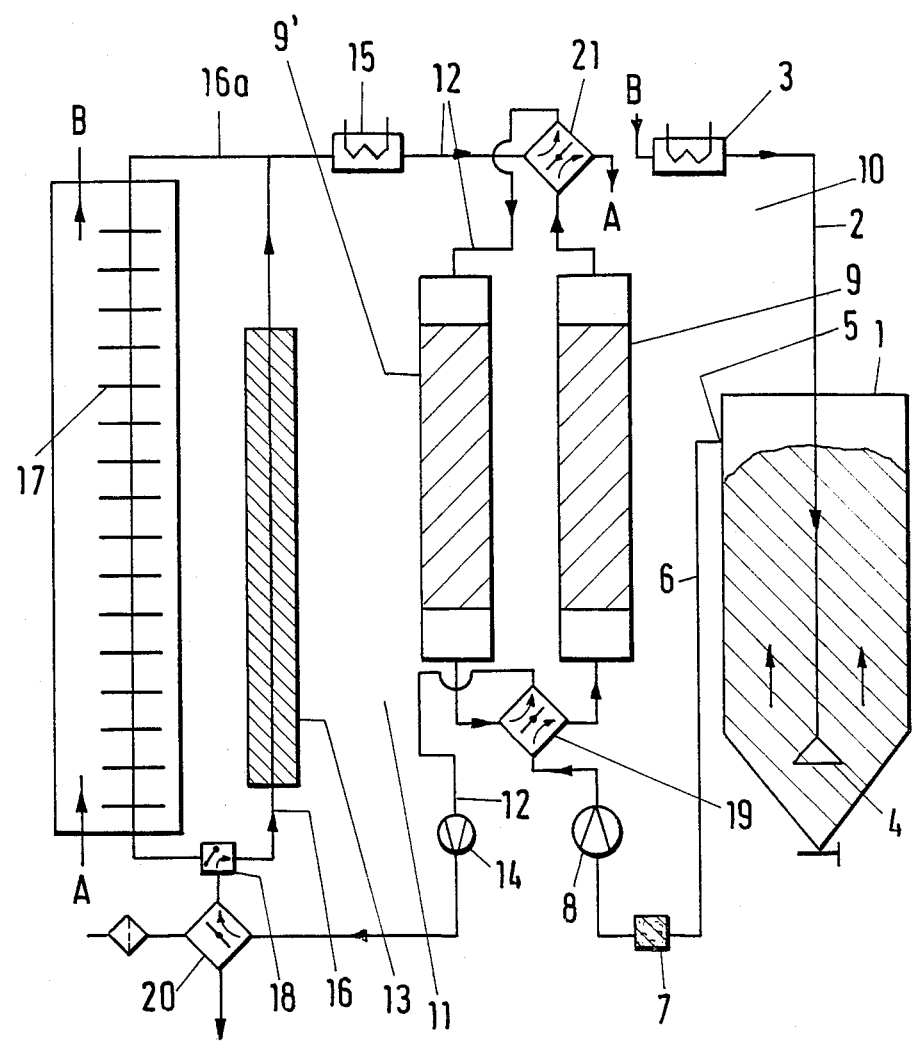
FIG. 1a shows a schematic representation of a drying apparatus according to the invention in which moisture laden drying air is conducted through one drying cartridge lying in a drying circuit and in which another cartridge is dried in a regeneration circuit.

In the illustrated drying apparatus, a material, preferably a synthetic plastic granulate or powder, located in a drying chamber 1 is dried by means of dry air, so called drying air. An inlet line 2 opens into the drying chamber 1, in which inlet line there is a heating device 3 with which the drying air flowing through the inlet line can be heated if desired The opening 4 of the inlet line 2 lies in the vicinity of the bottom of the drying chamber so that the dry air exiting from it flows upwardly in the drying chamber in the direction of the arrows shown in the drawing. In the upper region of the drying chamber 1 there is an outlet 5 to which a return line 6 is connected. In the return line there is a filter 7 for collecting dust and the like contained in the drying air flowing out of the drying chamber. In the return line 6 there is also a blower 8 which lies between the filter 7 and a drying cartridge 9 into which the return line opens. The inlet line 2 is likewise connected to the drying cartridge 9. The heating device 3 is disposed downstream in the direction of flow from the drying cartridge, which preferably is a molecular sieve cartridge.

The powder or granulate which is to be dried is located in drying chamber The drying air flows through the inlet line 2 into the drying chamber 1 and passes through the granulate or powder. The drying air thereby removes moisture from the granulate or powder and flows through the return line 6 and the filter 7 into the drying cartridge 9. There, the moisture taken up by the drying air is retained so that air which is dry again passes through the inlet line 2 into the drying chamber 1. Depending on the desired or required drying temperature, the drying air in the inlet line 2 may be warmed to the necessary temperature by the heating device 3. The drying air thus passes through a drying circuit 10, whereby the powder or granulate is dried in desired measure. Only one drying cartridge 9 is illustrated in the drying circuit 10 in the drawing. It is, of course, possible to utilize several drying cartridges 9 in the drying circuit.

The drying air is conducted through the circuit until the material to be dried in chamber is sufficiently demoisturized. When the drying cartridge 9 is used up and can only pick up a little additional moisture from the drying air, it is regenerated.

For this purpose the apparatus is provided with a regeneration circuit 11 in which the cartridge 9' to be regenerated lies. Connected to cartridge 9' is a line 12 which is surrounded by insulation 13 which for simplicity of illustration is only shown schematically in FIG. 1a on one portion of a branch line 16. Preferably all of the lines are separately insulated with respect to the atmosphere. A blower 14 lies in line 12 following the cartridge 9' to be regenerated in the direction of flow of the regeneration air, and a heating device 15 lies between the blower 14 and the cartridge 9'. The line 12 has an additional branch line 16a on which there is a heat exchanger 17, which preferably is likewise insulated on the outside. The branch line 16a can be opened or closed through a valve 18. In the illustration according to FIG. 1a, the branch line 16a is closed so that the regeneration air in the regeneration circuit 11 flows in the direction of the arrows shown in the drawing. In the regeneration circuit 11, dry air is conducted through the cartridge 9', whereby this air picks up the moisture from the cartridge 9' and thus drys it. The water which is found in the cartridge 9' must be converted to vapor form. Consequently, the regeneration air is strongly heated (to about 180° C. to 250° C.) by the heating device 15 before entry into the cartridge 9' so that the liquid in the cartridge 9' is converted into vapor form and thus can be picked up by the air flow. As a result of the conversion of the liquid into the vapor form, the air exiting from the cartridge 9' has been cooled so that the heating device 15 must heat the air again an amount corresponding to this cooling before it reenters the cartridge 9'. This temperature difference corresponds substantially to the heat of evaporation, which is necessary in order to convert the liquid in the cartridge 9' into the vapor form. Since no atmospheric air enters the regeneration circuit 11 during the aforedescribed drying operation, the cartridge 9' can be optimally demoisturized in the regeneration circuit 11. The insulation 13 makes sure that the heat losses during flow through line 12 are low so that the heating device 15 need only heat the regeneration air a little bit. By means of the closed regeneration circuit 11, the water found in the cartridge 9' can be evaporated practically without any loss of energy. There is a valve 19 built in between the lines 6 and 12 in front of the cartridge 9 in the direction of flow of the drying air and behind the cartridge 9' in the direction of flow of the regeneration air. In FIG. 1a this valve is in such a position that the drying air in line 6 is conducted to the drying cartridge 9 and the regeneration air after leaving the cartridge 9' to be regenerated is conducted to the heating device 15 via the blower 14.

Figure 2:
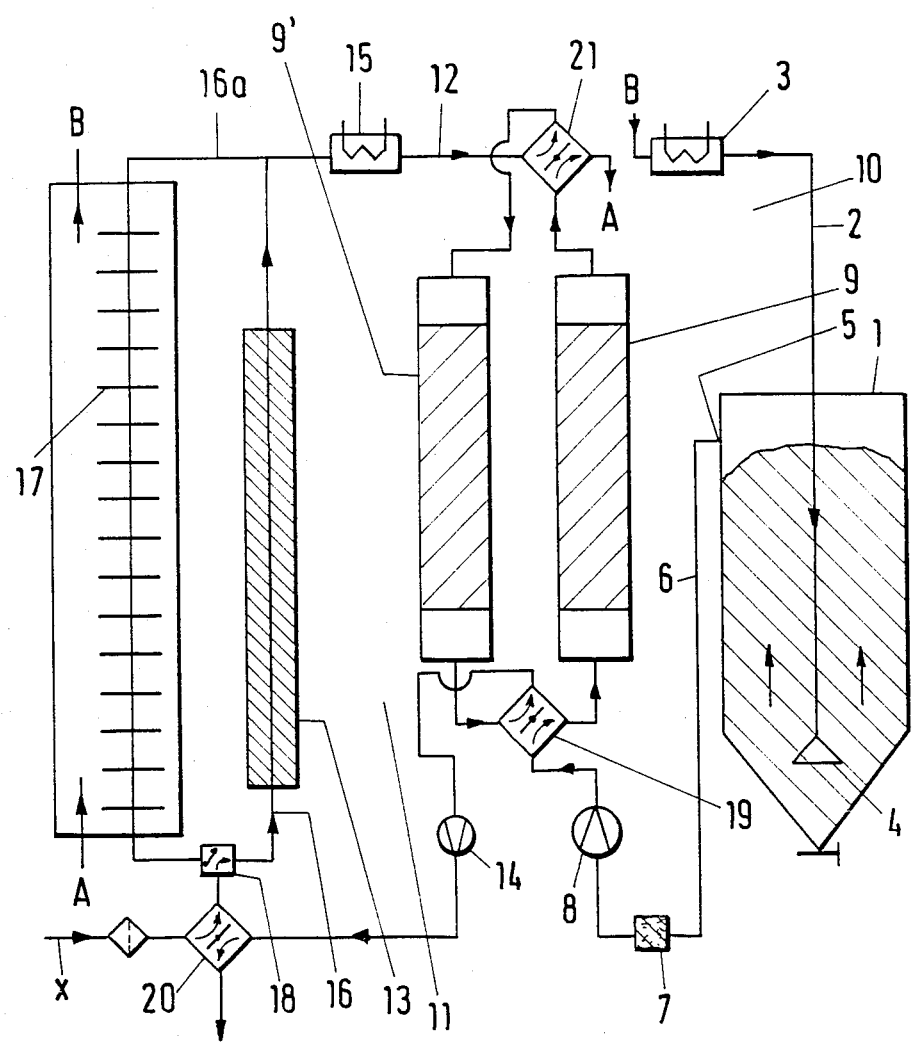
FIG. 2 shows the apparatus of FIG. 1a in which the regeneration circuit is opened to release hot air which has been utilized for the regeneration.

If the cartridge 9' is dried or if the air flowing in the regeneration circuit is saturated, the line 12 is briefly opened so that the regeneration air, which in the meantime has become loaded with moisture, can exit from the regeneration circuit 11. For this purpose an outlet valve 20, shown opened in FIG. 2, is provided in the line 12 following the blower 14. Simultaneously with the exit of the moisture laden regeneration air, new atmospheric air flows into line 12 at point "X" with which renewed drying can then be carried after closing the outlet valve. Moreover, with this new air either the same drying cartridge 9' or another drying cartridge can be dried in the aforedescribed manner. Although the atmospheric air contains a slight amount of moisture, the proportion of moisture within the regeneration circuit is small, however, because during the regeneration operation no new atmospheric air is drawn in, but instead the regeneration air is conducted in a closed circuit. During the exhausting of used regeneration air and the intake of new atmospheric air, the branch line 16a continues to remain closed (FIG. 2).

Figure 3:
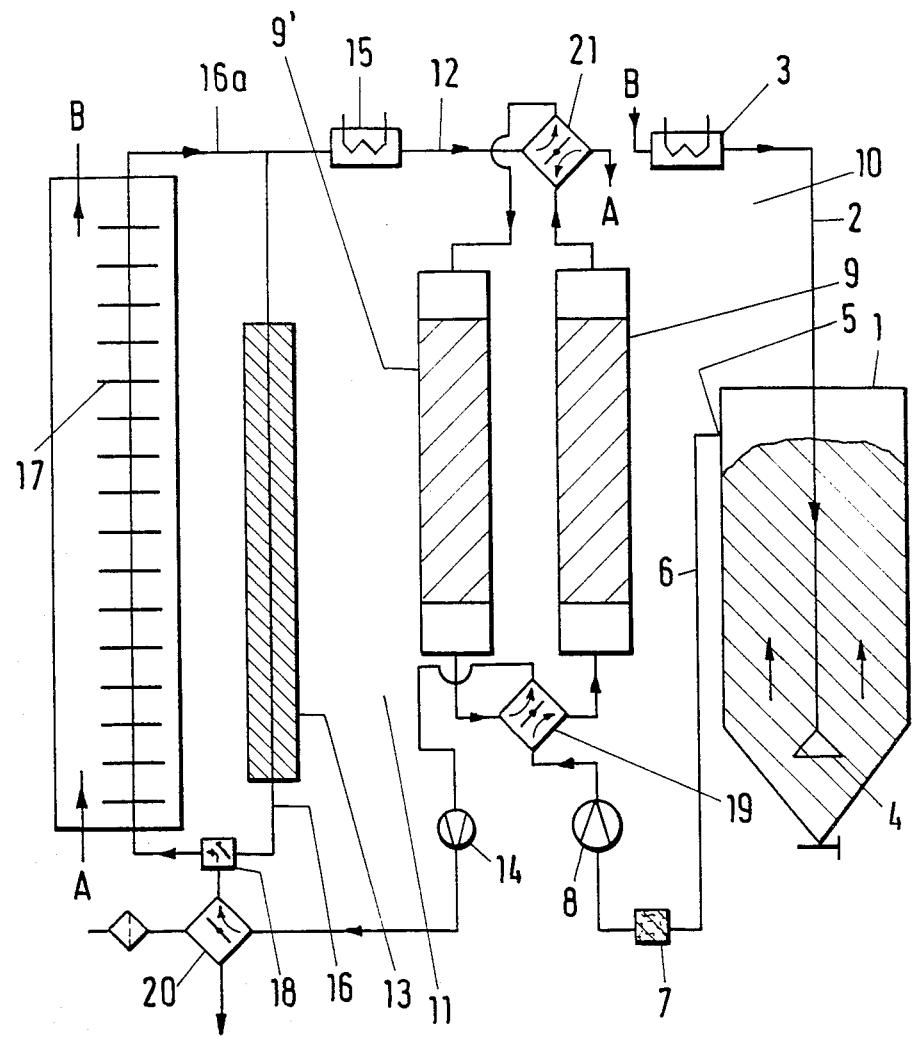
FIG. 3 shows the apparatus of FIG. 1a in which the one dried cartridge in the circuit is cooled.

When the cartridge 9' in the regeneration circuit 11 is dried, as a rule it cannot be switched immediately into the drying circuit 10 because it has been heated by the warm regeneration air during the regeneration process. The cartridge 9' is so warm following the regeneration that it must be cooled. To achieve this, the heating device 15 in regeneration circuit 11 is turned off or switched by turning valve 18 into line 16 which is not traversed by cooling air (FIG. 3). This has the advantage that the heat content contained in the heating device 15 is substantially preserved. In addition, the branch line 16a is opened through valves 20,18 so that the regeneration air in the circuit is passed through the heat exchanger 17 in the direction of the arrows in FIG. 3. Since the regeneration air is no longer warmed, it can pick up heat as it flows through the dried cartridge 9' and thereby cool it. The warmed air exiting from the cartridge 9' flows through the heat exchanger 17 and there releases its heat to the exchanger. In this way the cartridge 9' is cooled to the required temperature after drying (FIG. 1a and 2). The optimum cool-down temperature lies at the temperature which the drying cartridge has in the drying circuit. Thus it should be cooled to such an extent that at the end of the cool-down process the two cartridges 9, 9' (in the regeneration circuit and in the drying circuit) have the same temperature. It is advantageous to utilize the heat exchanger 17 in every case, since this is the most economical method to bring the two cartridges 9, 9' to the same temperature. The energy in the hot (regenerated) cartridge 9' can thereby be fully utilized and the targeting of the optimum cool-down temperature is necessarily achieved without further expenditure. So that these advantages can be achieved without the temperature in the drying circuit climbing too high, a regulating valve 18 may be utilized, instead of a switch-over valve, in the regeneration circuit 11 for switching from the heat-up phase to the cool-down phase. In the simplest case, a switch-over damper can alternatively be provided instead of the regulating valve 18. After the first switch-over to the heat exchanger 17, the damper is always closed when the temperature in the drying circuit 10 exceeds the desired target value and is switched over as soon as the temperature in the drying circuit falls below the target value. Since during the cool-down, the air is conducted in a circuit, i.e. no moisture laden atmospheric air is drawn in, the cartridge 9' does not become already charged with moisture during this cooling operation. As a result of this manner of operation, an extremely low dew point is achieved which lies on the order of magnitude of approximately −50° C. to −70° C. An optimum degree of efficiency of the apparatus is thus achieved through the aforedescribed regeneration. When the cartridge 9' has been cooled to the required temperature, it can be switched into the drying circuit 10 (FIG. 1b), so that it can once again remove moisture in the previously described manner from the drying air required in this circuit after passage through the material to be dried in the drying chamber 1.

The aforedescribed cooling of the regenerated cartridge 9' is necessary if it is warmer than the inlet temperature of the air flowing in the drying circuit 10 as it enters the drying cartridge 9. The heat exchanger 17 is a conventional air-air exchanger. The heat given off from heat exchanger 17 during the cooling can be used for warming the air in the drying circuit 10 or also for other uses. The air in the drying circuit 10 can be warmed with the released heat if it has a certain minimum temperature which lies, for example, at approximately 70° C. In this case the air in the drying circuit 10 can likewise be conducted through the heat exchanger 17, whereby it picks up the heat given off by the exchanger. The energy requirements of the apparatus can thereby be kept small.

In order to switch the regenerated cartridge 9' into the drying circuit again, valve 19 and a valve 21, which are built into lines 6 and 12, are utilized in a known manner. The valve 21 lies behind the cartridge 9 in the direction of flow of the drying air and in front of the cartridge 9' in the direction of flow of the regeneration air (FIG. 1a). In place of the valves 19, 21 and 18, 20, flap valves, rotating valves (rotating carousels) and the like may also be used.

The aforedescribed drying and cooling (FIG. 1a, 3) of the cartridge 9' in the regeneration circuit 11 is carried out in parallel with the drying operation of cartridge 9 in the drying circuit 10.

Figure 1B:
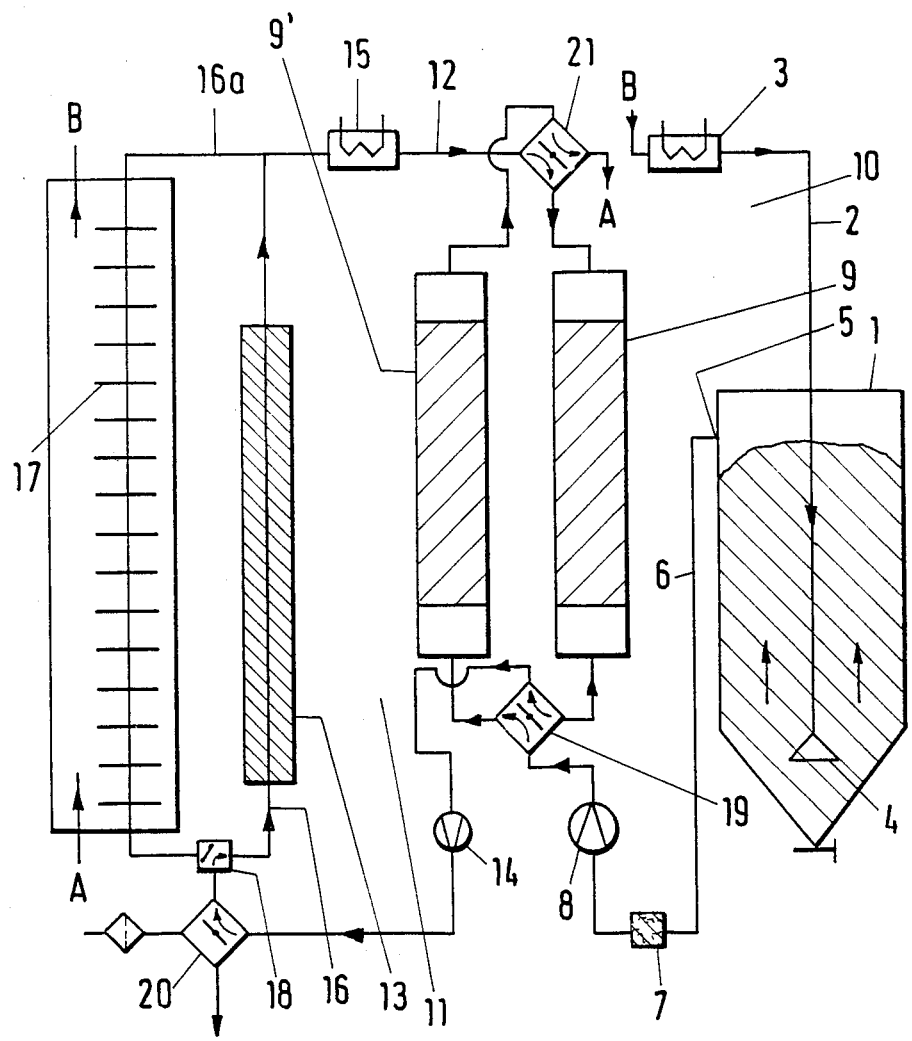
FIG. 1b shows an illustration corresponding to FIG. 1a, in which the one cartridge is switched into the regeneration circuit and the other cartridge is switched into the drying circuit.

If the apparatus has at least two drying cartridges, a continuous drying process is possible (FIG. 1a, 1b). So long as the one drying cartridge 9 lies in the drying circuit (FIG. 1a), the other cartridge 9' can be regenerated in the regeneration circuit 11. As soon as the drying cartridge 9 in the drying circuit 10 is all used up, the regenerated cartridge 9' in the regeneration circuit 11 can be switched into the drying circuit and the used drying cartridge 9 can be switched into the regeneration circuit (FIG. 1b). Additional drying cartridges may be provided in the drying circuit 10.

Figure 4:
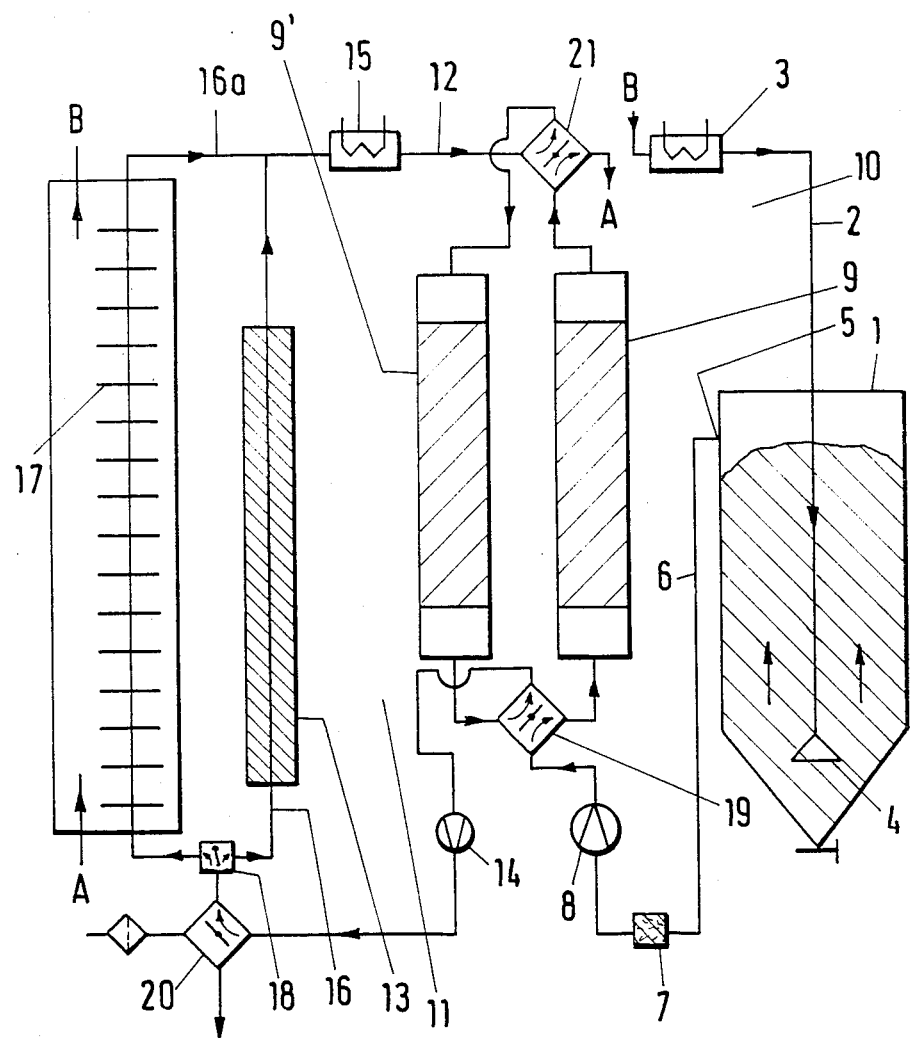
FIG. 4 shows a further possibility for conducting the regeneration air during the cooling down, in which only a partial stream of the energy which is to be carried away is passed in the partial stream through the heat exchanger.

FIG. 4 illustrates a way of utilizing the heat given off in the heat exchanger 17 to warm the air flowing in the drying circuit 10. After exiting from the drying cartridge 9, the air must be heated again to the prescribed inlet temperature before it is returned to the cartridge. In order to save energy thereby, the drying air is not conducted directly through the heating device 3 again, but is passed instead through the heat exchanger 17. As has been described with reference to FIG. 3, the heat exchanger 17 picks up the heat of the air flowing in the regeneration circuit which is to be cooled. This heat is picked up by the air in the drying circuit 10 which passes through heat exchanger 17. The drying air is thus already heated following its passage through the drying cartridge 9 so that it only needs to be heated a little more by the heating device 3.

The energy present in the cartridge 9' is transferred through the heat exchanger 17 to the drying circuit 10 in such a way that the valve 18 divides the regeneration circuit 11 so that a partial stream is conducted through the heat exchanger 17 in branch line 16a and another partial stream is conducted through branch line 16 (with heater 15 turned off). The one partial stream flowing through the heat exchanger 17 should be only so large that the temperature of the drying circuit 10 does not exceed the target value (with heater 3 turned off). The valve 18 can also be switched at frequent intervals such that it directs the regeneration circuit 11 through the branch line 16a or through branch line 16 depending on the energy requirements in the drying circuit 10. If only low drying temperatures can be utilized for the material in the drying chamber then the air exiting from the drying chamber is no longer conducted through the heat exchanger 17, but instead passes exclusively in the drying circuit 10 in accordance with FIG. 3. On the other hand, in this case, the cartridge 9' lying in the regeneration circuit 11 cannot be immediately switched into the drying circuit 10 after the regeneration (FIG. 1a and 2) because then the temperature of this cartridge 9' is still too high. In order to accelerate the cooling of the cartridge 9', as explained with reference to FIG. 3, the cooling air can be forced through the regeneration circuit with the blower 14 in the circuit in order to accelerate the heat exchange with the surroundings or for other purposes at the heat exchanger 17 through an increased flow rate and thereby rapidly cool the drying cartridge 9'.

I claim:

1. A drying apparatus including means for regenerating a moisture laden drying cartridge comprising a drying circuit including a drying chamber for material to be dried, means for circulating a flow of drying air through said drying chamber, and at least one drying cartridge connected to said air circulating means for removing moisture from a stream of air withdrawn from said drying chamber, a closed regeneration circuit through which a stream of regeneration air can be circulated to remove moisture from a moisture laden drying cartridge, and means for switching a drying cartridge from said drying circuit to said regeneration circuit, wherein said switching means comprises at least one air flow regulating device arranged between a return line of the drying circuit and a regeneration line of the regeneration circuit for switching the flow of drying air in the drying circuit and the flow of regeneration air in the regeneration circuit between drying cartridges.

2. An apparatus according to claim 1, wherein two air flow regulating devices are arranged between a return line of the drying circuit and a regeneration line of the regeneration circuit adjacent the inlets and outlets of the drying cartridge of the drying circuit and a cartridge being regenerated in the regeneration circuit.

3. A drying apparatus including means for regenerating a moisture laden drying cartridge comprising a drying circuit including a drying chamber for material to be dried, means for circulating a flow of drying air through said drying chamber, and at least one drying cartridge connected to said air circulating means for removing moisture from a stream of air withdrawn from said drying chamber, a closed regeneration circuit through which a stream of regeneration air can be circulated to remove moisture from a moisture laden drying cartridge, and means for switching a drying cartridge from said drying circuit to said regeneration circuit, wherein a flow regulating device is provided to control the flow of air in the regeneration circuit between a first branch which leads to a heating device and a second branch which passes through a heat exchanger.

* * * * *